Figure 1:
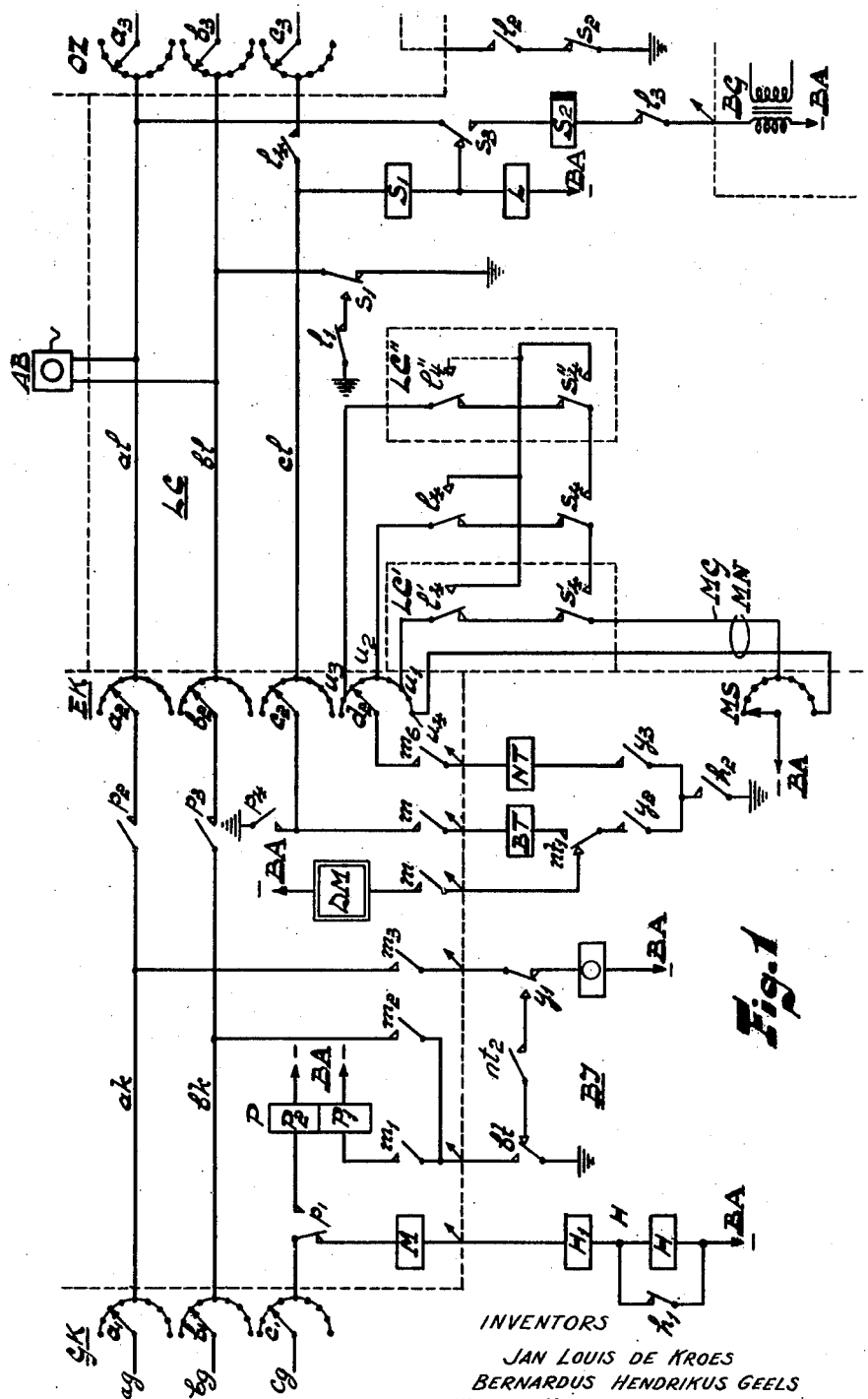

INVENTORS
JAN LOUIS DE KROES
BERNARDUS HENDRIKUS GEELS
WILLEM HENDRIK JOHANNES NICOLAI
BY
AGENT

United States Patent Office 2,816,171
Patented Dec. 10, 1957

2,816,171

MARKING CIRCUIT-ARRANGEMENT FOR POSITIONING A FINAL SELECTOR SWITCH

Bernardus Hendrikus Geels, Jan Louis de Kroes, and Willem Hendrik Johannes Nicolai, Hilversum, Netherlands, assignors, by mesne assignments, to North American Philips Company, Inc., New York, N. Y., a corporation of Delaware Application July 5, 1952, Serial No. 297,302

Claims priority, application Netherlands July 17, 1951

4 Claims. (Cl. 179—18)

This invention relates to marking circuits for use in automatic signalling systems, more particularly automatic telephone systems, for the numerical positioning of a final selector switch, a number of outlets from which is associated with a common number (P. B. X group).

It has been suggested to provide a circuit-arrangement in which the numerical positioning of selector switches is effected by testing under the control of a control device. In this case, selector switch outlet test contacts wiped by a first test wiper of the selector switch, are connected to marking conductors. Test contacts of outlets which correspond to the same number are connected to the same marking conductor. After reception of dialling pulses, the control device marks the test contact of the outlet or outlets corresponding to the desired number via the marking conductor concerned, for example, by connecting this conductor to a terminal of a voltage source. As soon as a selector switch reaches an outlet thus marked a test circuit is established across the test wiper, the test contact of the selector switch and the marking conductor and in this circuit a test relay is energised, thus stopping the movement of the selector switch. This is followed by a test via a further test wiper of the selector switch to find out whether the outlet is free or busy.

Such a circuit-arrangement has several disadvantages. The outlets of a group with which a common number is associated must be characterized as such outlets, because, if the selector switch has stopped on a busy outlet of such a group it should be possible for the test to be repeated with other outlets of the group. However, such marking requires a supplementary wiper on the selector switch or else a marginal voltage test is required to be effected. Further, if an operator wishes to connect a long distance call and all the outlets for the group are busy it must be possible to effect through-clearing of a busy outlet. In the known circuit-arrangement this is possible only with the last outlet of the group because first all the outlets must be tested before it is apparent that all the outlets are busy.

The object of the invention is to provide an improved marking circuit-arrangement for positioning a final selector switch.

According to the invention, a marking circuit-arrangement for use in an automatic signalling system, more particularly in an automatic telephone system, for the numerical positioning of a final selector switch, in which test contacts of outlets of the selector switch are connected to marking conductors and outlets corresponding to the same number are associated with the same marking conductor, control means being provided for the purpose of marking the test contact of a wanted outlet via a marking conductor in accordance with dialling signals received, causing the marked outlet to be found by the selector switch and testing whether the outlet found is busy, is characterized in that the test contacts of a group of outlets corresponding to the same number are connected to the marking conductor associated with this group via contacts of relays associated with the outlet (not permanently as in known circuit arrangements) such that if an outlet of the group is free the test contact of at least one free outlet and of none of the busy outlets is connected to the marking conductor and if all the outlets are busy the test contact of at least one of the busy outlets is connected to the marking conductor.

When a free group outlet is available the selector switch passes any busy outlet(s) of the P. B. X group and can stop only on a free outlet. However, if all the outlets of the group are busy, one or more busy outlets on which the selector switch can stop for connecting a call are indicated. There is consequently no necessity for marking P. B. X-group outlets as such, and through-clearing is possible on any group outlet intended for this purpose or on all the outlets of the group.

The invention will now be described with reference to the accompanying diagrammatic drawing, given by way of example, in which two embodiments of the invention are shown.

Figure 2:
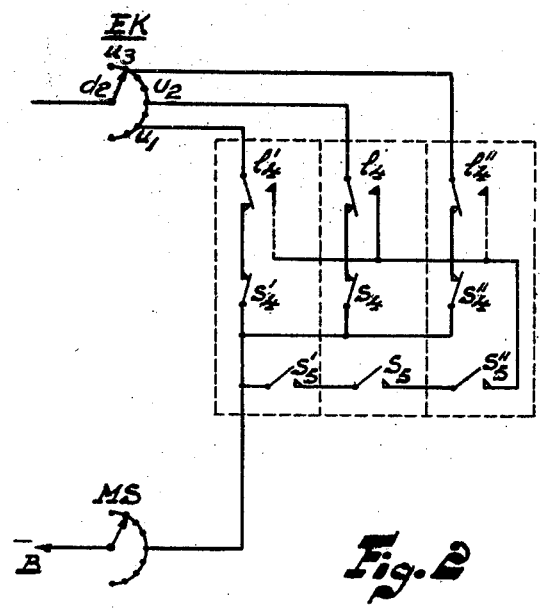

Fig. 1 illustrates the circuit diagram of a relevant portion of an automatic telephone system in accordance with this invention, and Fig. 2 illustrates a modification of the marking circuit shown in Fig. 1 in accordance with this invention.

Fig. 1 shows in a simplified form a subscriber's station AB, which is one of a group with which a common group number is associated, a line circuit LC associated with station AB, part of line circuits LC' and LC" associated with other stations of the group and a final selector switch EK the positioning of which can be controlled by a control device BI common to a number of final selector switches. In addition, OZ and GK designate a call finder and a group selector switch, respectively.

The line circuit LC includes a line relay L and a slow-to-release cut-off relay S having two windings $S_1$ and $S_2$. The relay combination may assume four different conditions. In the normal condition both relays L and S are de-energised. When the subscriber at station AB lifts the receiver to initiate a call, the line circuit assumes the calling condition in which the line relay L is energised in a circuit from earth via break contact $s_1$ of relay S, intelligence conductor $bl$, the line loop via the subscriber's station AB, intelligence conductor $al$, break contact $s_3$ of relay S and winding of relay L to the negative terminal BA of a battery (not shown) the positive terminal of which is connected to earth. In this condition, a starting circuit is closed via break contact $s_2$ of relay S and make contact $l_2$ of relay L with the result that a call finder OZ finds, in known manner, the outlet for the calling line, said outlet being indicated as calling due to the closure of contact $l_4$ of relay L which connects voltage from BA to the wiper $c_3$ of the called finder OZ. After the line is found, the wiper $c_3$ of the call finder is connected to earth potential by means not shown, so that the relay S is energised via contact $l_4$, winding $S_1$ and the winding of relay L, so that the line circuit LC is changed to its third condition (intelligence condition), the two relays L and S are energised and the line is marked busy due to the conductor $cl$ being connected to earth potential.

If the required connection is not established, for example, because the called station is busy, the connection of wiper $c_3$ to earth in the call finder OZ is interrupted and relay L is thus de-energised because contact $S_3$ has by now broken the energizing circuit from L to conductor $al$. Since, however, relay S is a slow-to-release relay, it is held energised in a circuit from earth via break contact $l_1$ of relay L, make contact $s_1$ of relay S, intelligence conductor $bl$, the line loop via the subscriber's station AB, intelligence conductor al, make contact $s_3$ of relay S, winding $S_2$, break contact $l_3$ of relay L and a winding of transformer BG, a second winding of which is coupled to busy tone generator (not shown), and the voltage at BA. The line circuit LC thus occupies its fourth condition (busy-tone holding condition) in which relay S only is energised and the busy tone generator supplies a busy tone to the subscriber's station AB via the said holding circuit of relay S. If the subscriber at station AB then replaces the receiver, relay S is released by reason of the line loop through AB being broken, the line circuit LC thus returning to its normal condition.

If the subscriber's station is connected via final selector switch EK, the wiper $c_2$ of this switch is connected to earth potential so that relay S (via winding $S_1$) and relay L are energised and the line circuit LC is thus in its third condition. At the end of the call, the earth connection to wiper $c_2$ is interrupted, with the result that the line circuit assumes its fourth condition as described above and the subscriber at station AB receives a busy tone, provided that the subscriber has not previously replaced the receiver.

The numerical positioning of the final selector switch is effected by testing under the control of the control device BI. The control device comprises a marking switch MS having some hundred outlet contacts corresponding to the various combinations of the last two digits of the subscribers' numbers and these outlet contacts are each connected via one of the marking conductors MN to the test contacts wiped by wiper $d_2$ of the final selector switch, such for example, as $u_1$, $u_2$, $u_3$ and $u_4$, and are associated with outlets for the final selector EK corresponding numerically to the outlet contacts of the test switch MS.

The outlet contacts $u_1$, $u_2$, $u_3$ are associated with outlets of a group of lines with which a common number is associated. The test contacts are connected, via contacts of the line and cut-off relay of the line group, to a common marking conductor MG which is connected to that outlet contact of the switch MS which corresponds to the group number. If all the lines of the group are free, test contact $u_1$ is connected to the marking conductor MG via the series combination of break contacts $l_4'$ and $s_4'$ of the line relay (not shown) and the cut-off relay (not shown) associated with the line circuit LC'. If the line circuit LC' is busy and the line circuit LC is free, test contact $u_2$ is connected to conductor MG via break contact $l_4$ of relay L, break contact $s_4$ of relay S and make contact $s_4'$ of the cut-off relay (not shown) of line circuit LC'. If both circuits LC and LC' are busy, test contact $u_3$ is connected to conductor MG via break contacts $l_4''$ and $s_4''$ of the line relay (not shown) and the cut-off relay (not shown), respectively of line circuit LC'', make contact $s_4$ of relay S and make contact $s_4'$ of the line circuit LC'. There is consequently always a test contact of a free outlet available and no test contacts of busy outlets are connected to conductor MG so long as there is still an outlet free in the group. Thus, the relay chain circuit of the make and break contacts $s_4'$, $s_4$ and $s_4''$ always indicates in a given order a free outlet, if one is available. However, if all the outlets for the group are busy, the test contacts $u_1$ and $u_2$ are connected to conductor MG via the make contacts $l_4''$, $s_4''$, $s_4$ and $s_4'$ and $l_4$, $s_4''$, $s_4$ and $s_4'$, respectively. Thus both when all the lines are busy and when free lines are available in the group, there is always at least one of the marking contacts of the group, which is connected to the conductor MG so that it is always possible for the final selector switches to find a marked outlet of the group, this outlet being in the first case a busy outlet and in the second case a free outlet.

The circuit arrangement operates as follows.

On the final selector switch EK and the control device BI being engaged by the group selector GK, conductor cg is connected to earth by means not shown, with the result that the connecting relay M and the marking relay H are energised from the voltage BA via wiper $c_1$ and test contact of group selector GK, break contact $p_1$ of relay P, winding of relay M, winding $H_1$ and break contact $h_1$ of relay H. As a result of break contact $h_1$ being opened, relay H connects its high-ohmic winding $H_2$ in series with the low-ohmic winding $H_1$, with the result that final selector switch EK and the control device BI are marked engaged. The dialling pulses are fed as earthing pulses via conductor ag, wiper $a_1$ and test contact of group selector GK, intelligence conductor ak, make contact $m_3$ of relay M and break contact y of relay Y (not shown), to a pulse-receiving relay O of the control device and under the control of this relay the test switch MS is positioned in a known manner not further described herein, in accordance with the dialling pulses received. The marking switch MS is shown in Fig. 1 as a switch, having a wiper which contacts with a number of outlet contacts; however, it is obvious that as an alternative use may be made of Geiger-Müller tube circuits comprising relays.

Assuming that the number of the line group has been selected, the wiper of switch MS is then positioned to connect to the outlet contact connected to conductor MG. After the dialling signals are received, relay Y is energised, by means not shown so that the rotary magnet DM of the final selector EK is energised via make contact $h_2$ of relay H, make contact $y_2$ of relay Y, break contact $nt_1$ of the numerical test relay NT and make contact $m_4$ of relay M and the selector switch is started, whilst a numerical test circuit is prepared from earth, via make contacts $h_2$ and $y_3$, winding of relay NT, make contact $m_6$ of relay M, wiper $d_2$ and the test contact of a desired outlet for the final selector EK, the connection thereof to conductor MG via contacts of line and cut-off relays, conductor MG, outlet contact and wiper of switch MS to battery.

Assume now that line circuit LC' is busy and the line to station AB is free. In this case, the test relay NT will be energised in the said test circuit as soon as the wiper $d_2'$ of final selector EK reaches the test contact $u_2$, which is connected to battery BA via break contacts $l_4$ and $s_4$, make contact $s_4'$, and the outlet contact and wiper of switch MS. Then break contact $nt_1$ of relay NT breaks the energizing circuit of rotary magnet DM so that the selector stops, and closes a second test circuit for testing whether the outlet is busy or free. This test is necessary, since, as mentioned hereinbefore the selector can also be stopped on busy outlet, if all the outlets for the group are busy and no difference is otherwise made between individual subscriber's lines and lines associated with a group of lines. The second test circuit extends from earth via make contacts $h_2$, $y_2$ and $nt_1$, winding of the relay BT, make contact $m_5$ of relay M, wiper $c_2$ and test contact of final selector EK, conductor cl, winding $S_1$ of relay S and relay L to battery BA. Since the outlet is free, relay BT is energised in this circuit. Relay P is energised via make contact bt of relay BT, contact $m_1$ of relay M and winding $P_1$ of relay P, whilst a signal is sent to the connecting circuit via make contact bt, make contact $m_2$ of relay M, intelligence conductor bk, test contact and wiper $b_1$ of the selector GK and conductor bg, as a sign that the line found is free and hence that a ringing signal is required to be supplied. Relay P connects the wiper $c_2$ of final selector EK to earth via make contact $p_4$ with the result that the outlet is marked busy and, via its make contacts $p_2$ and $p_3$, connects the intelligence conductors ak and bk to the wipers $a_2$ and $b_2$ of the final selector switch. In addition, via its make contact $p_1$ and its second winding $P_2$ relay P closes a holding circuit for itself. Due to contact $p_1$ being opened, the relays M and H are de-energised so that relays BT, NT and Y (not shown) are de-energised and the switch MS is restored to its normal position by means not shown.

Assume now that all the lines of the group are busy. In this case the test contacts $u_1$ and $u_2$ are connected to conductor MG via make contacts $l_4''$, $s_4''$, $s_4$ and $s_4'$ and $l_4$, $s_4''$, $s_4$ and $s_4'$, respectively. On any of these outlets, for example, that of the subscriber line AB, being reached, relay NT will be energised in a circuit from earth via make contacts $h_2$ and $y_3$, winding of relay NT, make contact $m_6$, wiper $d_2$ and test contact $u_2$ of final selector switch EK, make contact $l_4$, make contact $s_4''$, $s_4$ and $s_4'$, conductor MG, outlet contact and wiper of switch MS, to battery BA so that, in the manner described above, the selector switch stops and the second test circuit is connected via make contact $nt_1$. Since in this case the outlet is engaged and the test contact $u_2$ of final switch EK, which contact co-operates with wiper $c_2$, is consequently earthed, relay BT is not energised. Conductor $ag$ is then connected to earth via wiper $a_1$ and contact of the selector GK, intelligence conductor $ak$, make contact $m_3$ of relay M, make contact $y_1$ of relay Y, make contact $nt_2$ of relay NT and break contact $bt$ of relay BT as a sign that the outlet is busy. In this case, under the control of means in the connecting circuit, the connection will be broken, so that the earth connection of conductor $cg$ is removed, the relays M and H are de-energised and the circuit re-assumes its normal condition. However, if the call is made by an operator, who wants, for example, to offer a call, she may effect through-clearing of the busy line. For this purpose, conductor $bg$ of the selector switch GK is earthed so that relay P is energised via the wiper $b_1$ of the switch GK, make contact $m_2$, make contact $m_1$ and winding $P_1$. Relay P makes direct connection to the loop wires via contacts $p_2$ and $p_3$ and opens the energising circuit of the relays M and H, with the result that control device BI re-assumes its normal condition.

Fig. 2 shows a modification of the marking circuit arranged so that if some of the lines are free, test contacts of all the free lines are connected to conductor MG via the series combination of a break contact $l_4'$, $l_4$, $l_4''$ of the line relay associated with the line and a break contact $s_4'$, $s_4$, $s_4''$ of the cut-off relay. This consequently enables the selector switch to stop on any free outlet. If all the lines are busy, the test contacts of some or of all of the lines of the group, for example, the test contact $u_2$, are connected to conductor MG via make contact $l_4$ of the associated line relay and in addition via the series combination of make contacts $s_5''$, $s_5$ and $s_5'$ of the cutoff relay of all the lines of the group.

In the circuit-arrangements shown in Figs. 1 and 2, the contacts of the free outlets are connected to the marking conductor via break contacts each of which is open when the associated relay of the line relay and cut-off relays is energised with the interposition if desired, of break similar contacts of cut-off relays of other lines. Thus the test contacts of calling lines or other lines the line circuit of which is in the fourth condition, in which consequently in the first case only the line relay and in the second case only the cut-off relay is energised, are not connected to the marking conductor and hence cannot be engaged by the final selector switch. As an alternative the circuit may be arranged so that test contacts of free outlets are connected to the marking conductor only via a break contact which is open when the line relay is energised or only via a break contact which is open when the cut-off relay is energised, whereas on all the outlets being engaged the test contacts of some or of all of the lines of the group can be connected to the marking conductor via a circuit which includes a make contact which is closed when the associated line relay or the cut-off relay is energised and make contacts each of which is closed when the associated relay of the line or cut-off relays of all the lines of the group is energised. Thus, for example, in the circuit shown in Fig. 2 direct connection may be made between the break contacts $l_4'$, $l_4$, $l_4''$ or alternatively between the break contacts $s_4$, $s_4''$ and $s_4'$, or in other words these contacts are omitted. In the former case, the lines can be engaged by the final selector switch EK also in the calling condition and in the second case also in the fourth condition.

What we claim is:

1. In an automatic telephone system provided with a final selector switch having outlets including test contacts and having a wiper adapted to selectively engage said test contacts; a marking circuit for the numerical positioning of the wiper of said selector switch comprising marking conductors, control means for electrically marking the test contact of a wanted outlet via a marking conductor in accordance with incoming dialling signals, means to cause the marked contact to be found by the wiper of said selector switch and to test whether the found outlet is busy, and a system including relays provided with contacts normally connecting the test contacts of a group of outlets corresponding to the same directory number to a marking conductor associated with said group, said relays having additional contacts adapted to connect the test contact of at least one free outlet and none of the busy outlets to said marking conductor if an outlet of the group is free, and means responsive if all the outlets are busy to cause said relays to connect the test contact of at least one of the busy outlets of the group to the marking conductor.

2. A marking circuit as set forth in claim 1 wherein the test contacts of the group of outlets corresponding to the same directory number are connected to the corresponding marking conductor via a first circuit of the relay system which includes a contact which is open when a relay included in said first circuit is operated, said relay being operated only when said first circuit is in a first condition, and wherein the test contact of at least one of the outlets of the group is also connected to a marking conductor via a second circuit of said relay system, said second circuit including the series combination of make contacts each of which is closed when each relay corresponding to the first circuit relay of each outlet of the group is operated, said relays being operated only when said second circuit is in said first condition.

3. A marking circuit as set forth in claim 2 wherein said first circuit includes the series combination of two open-on-operation contacts of relays included therein, one of said open-on-operation relays being operated in a second condition and in a third condition of said first circuit and the other relay being operated in said third condition and in a fourth condition.

4. A marking circuit as set forth in claim 3 wherein at least one of said first circuits further includes closed-on-operation contacts of relays connected in the circuits of other outlets of the groups.

References Cited in the file of this patent
UNITED STATES PATENTS

| | | |
|---|---|---|
| 1,799,175 | Merk | Apr. 7, 1931 |
| 1,840,950 | Hatton | Jan. 12, 1932 |
| 2,583,014 | Pouliart | Jan. 22, 1952 |
| 2,593,418 | den Hertog | Apr. 22, 1952 |
| 2,602,122 | Lesigne | July 1, 1952 |
| 2,692,617 | Mauge | Oct. 26, 1954 |